A. B. BOLENDER.
GEAR HOLDING CHUCK.
APPLICATION FILED AUG. 26, 1916.
1,330,998.
Patented Feb. 17, 1920.
2 SHEETS—SHEET 2.
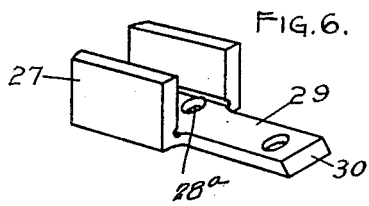
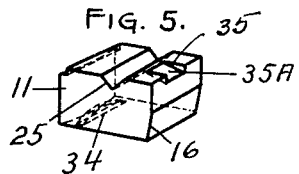
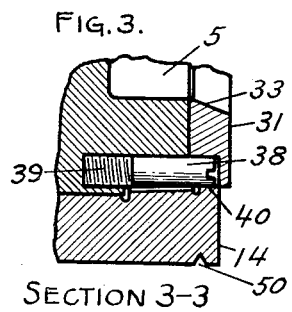
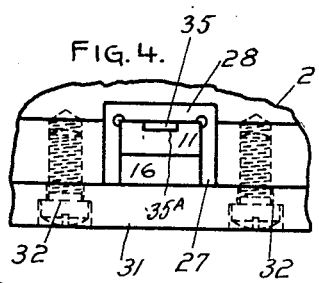
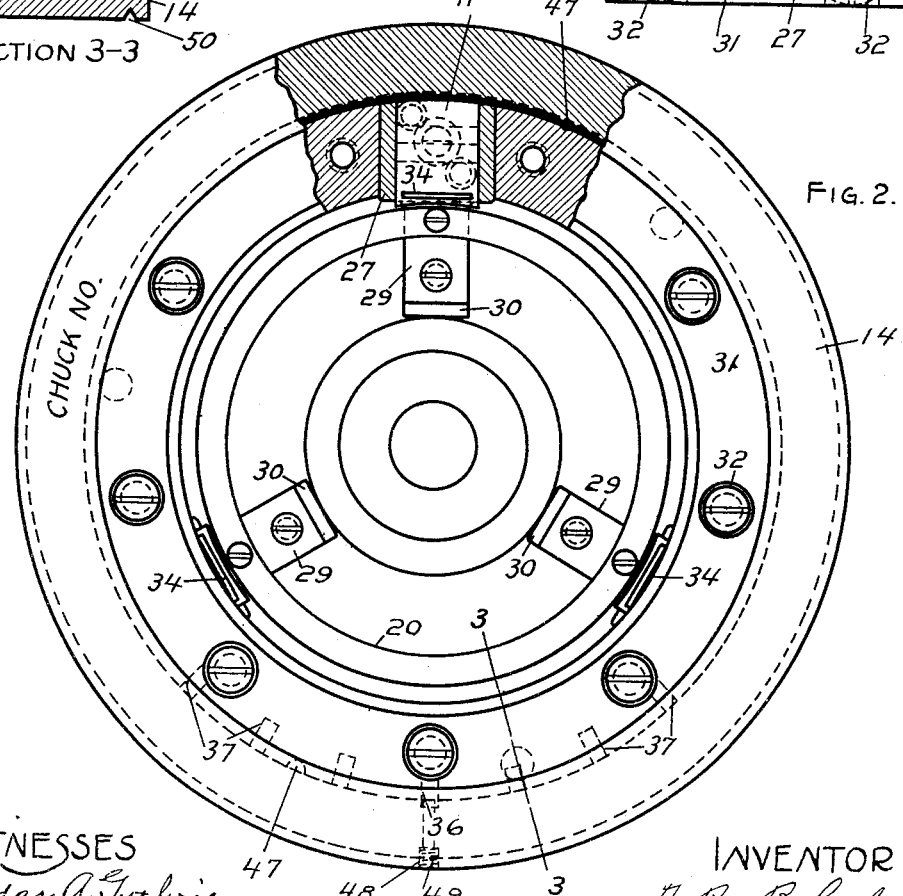
WITNESSES
INVENTOR
A. B. Bolender
by J. F. Byrne
ATTY.

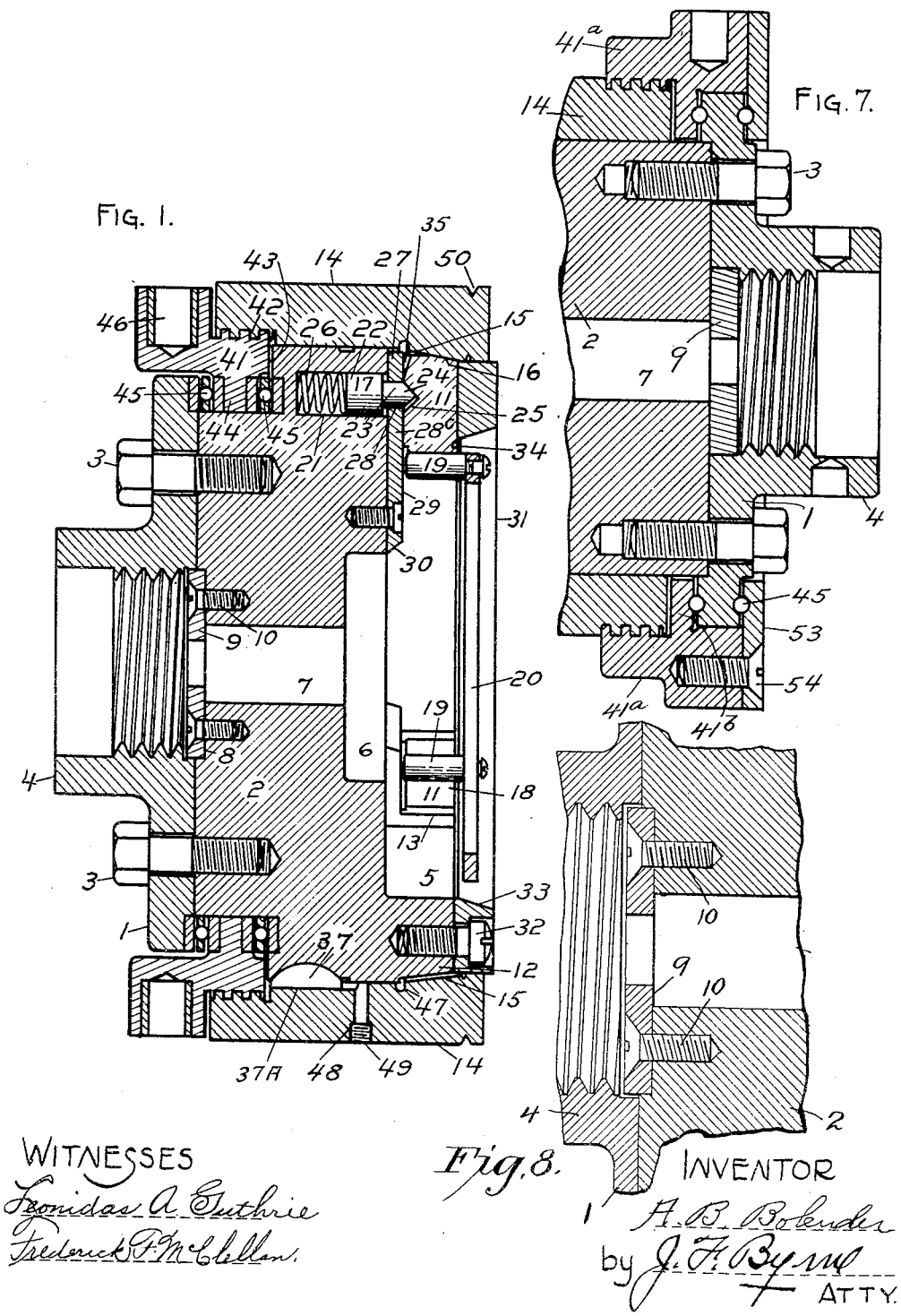
A. B. BOLENDER.
GEAR HOLDING CHUCK.
APPLICATION FILED AUG. 26, 1916.
1,330,998.
Patented Feb. 17, 1920.
2 SHEETS—SHEET 1.

UNITED STATES PATENT OFFICE.

AUGUSTUS B. BOLENDER, OF MUNCIE, INDIANA.

GEAR-HOLDING CHUCK.

1,330,998.  Specification of Letters Patent.  Patented Feb. 17, 1920.

Application filed August 26, 1916. Serial No. 116,981.

*To all whom it may concern:*

Be it known that I, AUGUSTUS B. BOLENDER, a citizen of the United States, residing at Muncie, in the county of Delaware and State of Indiana, have invented certain new and useful Improvements in Gear-Holding Chucks, of which the following is a specification.

My invention relates to improvements in chucks, and one of its objects is the provision of a novel device of the character in which a gear may be readily and quickly secured and centered so that its opening may be ground true to its axis and to the pitch of its teeth.

A further object is the provision of a gear holding chuck which may be readily and quickly secured to the work-spindle of a grinding machine.

A further object is to provide a gear holding chuck which may be readily and quickly trued after it has been secured to the work-spindle.

A still further object is the provision of a gear holding chuck which shall be emery-dust and water-proof.

Another object is the provision of a gear holding chuck which may be speedily altered for the reception of gears of different diameters.

The invention also has for its object the provision of a gear holding chuck which shall be simple, durable and efficient, which may be manufactured and sold at a comparatively low cost, and which shall last a comparatively long time.

With the above and other objects in view, the invention consists in the construction, combination and arrangement of parts hereinafter fully described and claimed, and illustrated in the accompanying drawings, wherein:

Figure 1 is a longitudinal sectional view, taken on a plane extending vertically and centrally through a chuck constructed in accordance with my invention, Fig. 2 is a view in front elevation of the chuck, the upper portion of the same being in vertical section, Fig. 3 is a section on the line 3—3 of Fig. 2, Fig. 4 is a top plan view of a portion of the front end of the body of the chuck, Fig. 5 is a detail perspective of one of the jaws, and Fig. 6 is a similar view of one of the jaw shoes, Fig. 7 is a vertical sectional view illustrating a modified form of wing nut, Fig. 8 is a sectional view of the central portions of the body and face plate, illustrating on an enlarged scale the loose fit of the member employed to prevent the chuck from getting out of true to any great extent.

Referring to the drawings by reference numerals, 1 designates the face plate and 2 the body of my improved chuck. These parts are connected together by bolts 3. The face plate 1 is provided with a screw threaded hub 4 for the reception of the work spindle of a grinding machine.

The body 2 is cylindrical, and has in its front face a cylindrical concentric recess 5 for the reception of the gear to be worked upon. In rear of this recess, the body 2 has a smaller and also concentric recess 6 for the reception of one end of the gear's hub. A bore 7 extends from the circular wall of the recess 6 to and through the rear face of the body 2, and it is axially alined with the hub 4. The rear face of the body has a recess 8, which is larger than the bore 7 and is concentric with the bore 7 and hub 4, and in which a disk 9 is seated. This disk, which is secured in position by bolts 10, has a loose fit in the face plate 1, and serves to prevent the chuck from getting out of true to any great extent. It also provides means by which sufficient adjustment may be made to true the chuck up after it has been placed upon the work-spindle.

The body 2 is provided in the plane of the gear receiving recess 5 with three gear or any desired number of gear securing and truing jaws 11. These jaws are to be equally spaced, and are mounted for radial movements in the direction of and away from the axis of the recess 5. To receive the jaws 11, the body 2 is provided with the flange 12, formed by the recess 5, and having openings 13 which extend through the inner and outer sides of the flange 12. The jaws 11 are simultaneously moved inwardly to an equal degree by a sleeve 14 mounted upon the periphery of the body 2 for forward and rearward sliding movements with relation to the body. Near its front end the sleeve 14 is provided with an inwardly and forwardly directed annular bevel 15, which coöperates with the correspondingly beveled outer ends 16 of the jaws 11. This construction is such that when the sleeve 14 is moved rearwardly the jaws 11 are simultaneously moved to an equal degree into active or gear clamping position. When the sleeve 14 is moved forwardly the jaws 11 are free to be moved outwardly into inactive or gear releasing position by puppets 17. The jaws have arcuate inner or active faces 18, which are adapted to engage three pins 19, or a number to correspond with number of jaws, carried by a ring 20. These pins are adapted to be placed between the teeth of a gear, after which the gear is placed in the recess 5 with the pins 19 in position to be engaged by the active faces 18 of the jaws 11. When the jaws 11 are moved inwardly by the rearward sliding movement of the sleeve 14, their active faces 18 engage the pins 19, and, owing to their curvature, and to the fact that they are moved inwardly to an equal degree, carry the gear to its proper position with relation to the axis of the chuck, so as to permit the hole in the gear to be ground true to the axis of the gear and the pitch of the teeth. Since it requires but a slight movement of the sleeve 14 to move the jaws 11 into active position, and to release them, and since the jaws when released are automatically and quickly returned to inactive position, the gear may be readily and quickly secured in and removed from the chuck.

The puppets 17 are slidably mounted in sockets 21 in the body 2, and each comprises a cylindrical body 22 and a reduced outer stem 23. The outer ends of the stems 23 are beveled, as at 24, for engagement in V-shaped recesses 25 formed in the rear sides of the jaws 11. Mounted in rear of the puppets 17 are springs 26, which permit the puppets to yield inwardly when the jaws 11 are forced into active position, and which force the puppets 17 forwardly when the jaws 11 are released. This forward movement of the puppets 17 returns the jaws 11 to inactive position, in which position they are normally held by the puppets. Shoes 27 of the form shown in Fig. 6, and in which the jaws slide, are secured in the slots 13. The rear sides 28 of the shoes 27 extend over the sockets 21 and prevent the displacement of the puppets 17, these sides being provided with openings 28ᶜ through which the stems 23 extend. These shoes establish an emery dust and water proof connection between the jaws and body. These sides also extend to the annular wall of the recess 6 to provide seats 29 against which the gear rests. The inner ends of the seats 29 are beveled, as at 30. The jaws 11 are held in position against lateral displacement by a ring 31 secured to the front side of the flange 12 by bolts 32, the inner side 33 of the ring being beveled so as to prevent its interfering with the insertion of a gear into the recess 5.

When it is desired to use larger or smaller jaws those in the chuck may be readily and quickly removed by a screw driver or the like tool. To remove the jaws it is only necessary to place a tool in the slots 34 and exert an inwardly directed force on the tool.

In their inner sides near their outer ends, the jaws are provided with recesses 35 having front beveled walls 35ᵃ, which permit these ends to be forced beyond the puppets by inserting jaws into the slots 13.

To hold the sleeve 14 against rotary movement with relation to the body 2, and to permit the sleeve to be adjusted, upon the body so as to position new portions of the bevel 15 in contact with the outer ends of the jaws 11 when those portions in contact with the ends become worn, the sleeve is provided with a key 36 and the body with a plurality of relatively spaced ways 37. The key 36 has a sliding fit in the slot in the outer sleeve 37ᵃ, and when it is desired to position new portions of the bevel 15 in engagement with the jaws 11 it is only necessary to so adjust the sleeve upon the body 2 as to position the key 36 in another way 37. This permits the entire length of the bevel 15 to be used before it becomes necessary to retrue the bevel 15, thereby greatly increasing the life of the chuck.

The sleeve 14 is held true at all times by studs 38 which have a thread connection 39 with the body 2 and which are ground at 40 for a close sliding fit with the inner side of the sleeve 14. The ring 31 is held in position by the stud 38, preventing accidental displacement.

The means by which the sleeve 14 may be moved rearwardly and forwardly upon the body 2 when it is desired to move the jaws 11 into active position or release them, comprises a ring nut 41 rotatably mounted upon the body 2 and having a threaded connection 42 with the sleeve. The body 2 is rabbeted at 43 for the reception of the ring nut 41, and the ring nut is provided with an annular rib 44 on both sides of which are ball bearings 45. The face plate 1 secures the ring nut 41 in position at all times. At its rear end the ring nut 41 is provided with a plurality of sockets 46 to permit it to be turned by a pin of suitable length.

Oil grooves 47 are provided in the opposing surfaces of the body 2 and sleeve 14, and the sleeve is provided with a filling hole 48 threaded for the reception of a plug 49. All of the oil grooves 47 are filled with lard oil. Beyond the bevel 15, the sleeve 14 has a close sliding fit with the periphery of the ring 31 to prevent the escape of oil at the front end of the chuck and to prevent emery dust and water from entering the chuck.

The periphery of the sleeve 14 is ground true to permit the sleeve to be used in truing the chuck.

From the foregoing description, taken in connection with the accompanying drawings, it should be apparent that I provide a chuck which may be speedily secured to the workspindle of a grinding machine, which may be easily and quickly trued, and which is emery dust and water proof. It should also be apparent that the jaws of the chuck may be speedily changed to adapt the chuck for holding gears of various diameters, and that a gear will be automatically centered so that its opening may be ground true to the pitch line of the gear.

In Fig. 7 of the drawings, a modified form of ring nut is shown. This ring nut, designated 41ª, has threaded engagement with the outer periphery of the sleeve 14, and is rotatably mounted upon the periphery of the face plate 1. It is secured in place by a flange 41ᵇ and an annular plate 53, the plate being secured to the ring nut by screws 54. Bearings 45 are positioned between the face plate 1 and the flange 41ᵇ and the plate 53. A groove 50 is cut in the periphery of the sleeve 14 to prevent water from creeping back over the sleeve. The adjustment for truing up the chuck is permitted by the loose fit of the member 9 in the counter bore of the face plate 1.

While I have shown and described the preferred embodiment of my invention, it will be understood that minor changes in construction, combination and arrangement of parts may be made without departing from the spirit and scope of the invention as defined by the claims.

Having thus described my invention, what I claim as new, is:

1. A chuck including a face plate, a body, means adjustably securing the body to the face plate, and a member mounted between the body and face plate to prevent the chuck from getting out of true to any great extent.

2. A chuck including a face plate, a body, means adjustably securing the body to the face plate, and a disk secured to the body and having a loose fit in the face plate to prevent the chuck from getting out of true to any extent.

3. A chuck comprising a body, jaws slidably mounted upon the body and having beveled outer ends, said jaws also having recesses in their sides, a sleeve slidably mounted on the body and having a bevel engaging said outer ends, means for moving the sleeve upon the body, and spring pressed puppets engaging in the recesses of the jaws, and said puppets being adapted to yield in jaw releasing direction on the application of a radially directed force to the jaws, whereby to permit the jaws to be applied and removed without removing any other part of the chuck.

4. A chuck comprising a body, jaws slidably mounted on the body, a sleeve mounted on the body, a key carried by the sleeve and interchangeably engaging in one of a plurality of ways in the body, means by which the sleeve may be moved on the body, and spring means engaging the jaws, said jaws and sleeve having coacting beveled portions.

5. A chuck including a cylindrical body provided with a plurality of keyways in its periphery, a jaw actuating sleeve mounted on the periphery of the body and provided with a bevel on its inner side, a key carried by the sleeve and engaging one of said keyways, said sleeve being adjustable upon the body to permit the key to be inserted in another of said ways, jaws carried by the body, and means for actuating the sleeve.

6. A chuck comprising a body, jaws slidably mounted upon said body and having beveled outer ends, a jaw actuating sleeve slidably mounted upon the body and having a bevel engaging said ends, said sleeve being adjustable upon the body to position new portions of its bevel in contact with said ends, means by which the sleeve may be actuated to move the jaws into active position and to release them, and means for returning the jaws to inactive position when they are released.

7. A chuck including a jaw actuating sleeve having its periphery ground true to permit the sleeve to be used in truing the chuck.

8. A chuck including a cylindrical body, radially movable jaws carried by the body, a jaw actuating sleeve slidably mounted upon the body, a rotatably mounted wing nut having threaded connection with the sleeve, and an axially arranged and axially movable spring pressed puppet engaging each jaw, a puppet being provided for each jaw.

9. A chuck comprising a cylindrical body having an annular recess in its front face, said body also having radial openings extending through the periphery of the body and the annular wall of said recess, jaws slidable in said openings and having arcuate inner ends and beveled outer ends, a jaw actuating sleeve slidable and circumferentially adjustable upon the periphery of said body, said sleeve having its inner surface provided with an annular bevel engaging the outer ends of said jaws, a rotatable ring nut having a threaded connection with the sleeve, and spring pressed puppets carried by the body and engaging the jaws.

10. A chuck comprising a body, radially movable jaws provided with recesses, jaw actuating means, and axially arranged and axially movable spring pressed puppets engaging in said recesses to normally hold the jaws in inactive position.

11. A chuck comprising a body, radially movable jaws each having a recess provided with an inclined wall, jaw actuating means, and axially arranged spring pressed puppets having beveled ends engaging said walls to normally hold the jaws in inactive position.

12. A chuck comprising a body, radially movable jaws each having a recess provided with an inclined wall and each having a bevel near its outer end, jaw actuating means, and axially arranged spring pressed puppets having beveled ends engaging said walls to normally hold the jaws in inactive position.

13. A chuck comprising a body having a flange provided with radial openings, jaws slidably mounted in said openings, jaw actuating means, and spring pressed means normally holding the jaws in inactive position, and said means being adapted to recede in jaw releasing direction on the application of a radially directed force to the jaws, whereby to permit the jaws to be applied and removed without removing any other part of the chuck.

14. A chuck including a cylindrical body provided with a plurality of keyways, radially movable jaws carried by the body and having beveled outer ends, a sleeve mounted on the body and having a beveled inner portion engaging the beveled outer ends of the jaws, a key engaging the sleeve and interchangeably engaging in one of said ways, and sleeve actuating means.

15. A chuck including a cylindrical body, jaws carried by the body, a jaw actuating sleeve mounted on the periphery of the body, sleeve actuating means, and studs carried by the body and engaging the inner side of the sleeve to hold the latter true.

16. A chuck including a cylindrical body having a recess in its front face, said body also having radial openings extending through the periphery of the body and into the recess, jaws slidably mounted in said openings, a jaw actuating sleeve mounted upon the periphery of the body and having a close fit therewith in front and rear of the jaws to render the chuck emery dust and water proof, and means for actuating the sleeve.

17. A chuck including a body having a recess in its front face, front and rear cylindrical portions and an intermediate beveled portion formed on the periphery of the body, said body also having radial openings extending through said beveled portion and into the recess, jaws slidably mounted in said openings, a jaw actuating sleeve having its inner wall provided with front and rear cylindrical portions engaging the corresponding portions of the periphery of the body and an intermediate beveled portion, and sleeve actuating means.

18. A chuck including a body having radial openings, a shoe removably secured in each opening and forming a wear surface therefor, jaws slidably mounted in the shoes, and jaw actuating means.

19. A chuck including a body having a gear receiving recess and radial openings, a shoe mounted in each opening, gear rests carried by the shoes and extending into the recess, jaws slidably mounted in the shoes, and jaw actuating means.

20. A chuck including a body having a gear receiving recess and radial openings, a shoe mounted in each opening, gear rests located in the recess in alinement with the shoes, jaws slidably mounted in the shoes, and jaw actuating means.

21. A chuck including a body having radial openings, a shoe mounted in each opening, jaws slidably mounted in the shoes, puppets held in place by the shoes, and jaw actuating means.

22. A chuck including a body, shoes carried by the body, jaws slidably mounted in the shoes, puppets held in place by the shoes, and jaw actuating means.

23. A chuck including a body having a recess in its front face, front and rear cylindrical portions and an intermediate beveled portion on the periphery of the body, said body also having radial openings extending through said beveled portion and into the recess, jaws slidably mounted in said openings, a jaw actuating sleeve having its inner wall provided with front and rear cylindrical portions engaging the corresponding portions of the body and having an intermediate beveled portion, sleeve actuating means, and shoes establishing an emery dust and water proof connection between the jaws and body.

24. A chuck including a body, jaws carried by the body, shoes establishing an emery dust and water proof connection between the jaws and body, and a jaw actuating sleeve mounted upon the body and having emery dust and water proof contact therewith.

25. A chuck including a body, jaws carried by the body, a jaw actuating sleeve carried by the body and having a bevel engaging said jaws, the body and sleeve being adapted for relative adjustment to position different portions of the bevel in contact with the jaws, means securing the body and sleeve in adjusted relation, and sleeve actuating means.

In testimony whereof I affix my signature in the presence of two witnesses.

AUGUSTUS B. BOLENDER.

Witnesses:
  Leonidas A. Guthrie,
  Frederick F. McClellan.